US012673310B2

(12) United States Patent
Wang et al.

(10) Patent No.: US 12,673,310 B2
(45) Date of Patent: Jul. 7, 2026

(54) ABSORBENT COMPOSITIONS, METHODS OF FORMING THE SAME, AND ANIMAL LITTER PREPARED WITH SUCH COMPOSITIONS

(71) Applicant: U.S. Silica Company, Katy, TX (US)

(72) Inventors: Qun Wang, Reno, NV (US); Jonas Reid Pearce, Reno, NV (US); David Reyes, Reno, NV (US); Tim Meredith, Sparks, NV (US)

(73) Assignee: U.S. Silica Company, Katy, TX (US)

( * ) Notice: Subject to any disclaimer, the term of this patent is extended or adjusted under 35 U.S.C. 154(b) by 0 days.

(21) Appl. No.: 18/998,276

(22) PCT Filed: Jul. 26, 2023

(86) PCT No.: PCT/US2023/028660

§ 371 (c)(1),
(2) Date: Jan. 24, 2025

(87) PCT Pub. No.: WO2024/025929

PCT Pub. Date: Feb. 1, 2024

(65) Prior Publication Data

US 2026/0102755 A1    Apr. 16, 2026

Related U.S. Application Data

(60) Provisional application No. 63/392,331, filed on Jul. 26, 2022.

(51) Int. Cl.
| | |
|---|---|
| *B01J 20/14* | (2006.01) |
| *A01K 1/015* | (2006.01) |
| *B01J 20/12* | (2006.01) |
| *B01J 20/26* | (2006.01) |
| *B01J 20/28* | (2006.01) |
| *B01J 20/30* | (2006.01) |
| *B01J 20/32* | (2006.01) |

(52) U.S. Cl.
CPC ............ *B01J 20/14* (2013.01); *A01K 1/0155* (2013.01); *B01J 20/12* (2013.01); *B01J 20/261* (2013.01); *B01J 20/28004* (2013.01); *B01J 20/2803* (2013.01); *B01J 20/3021* (2013.01); *B01J 20/3028* (2013.01); *B01J 20/3042* (2013.01); *B01J 20/3204* (2013.01); *B01J 20/327* (2013.01)

(58) Field of Classification Search
CPC .. A01K 1/0155; A01K 1/0154; A01K 1/0152; B01J 20/14
See application file for complete search history.

(56) References Cited

U.S. PATENT DOCUMENTS

| | | | | |
|---|---|---|---|---|
| 3,789,797 A | * | 2/1974 | Brewer | A01K 1/0155 |
| | | | | 71/21 |
| 4,535,072 A | * | 8/1985 | Kitayama | B01J 20/28004 |
| | | | | 423/240 R |
| 5,094,189 A | * | 3/1992 | Aylen | A01K 1/0154 |
| | | | | 119/173 |
| 5,176,107 A | * | 1/1993 | Buschur | A01K 1/0154 |
| | | | | 119/172 |
| 5,188,064 A | * | 2/1993 | House | A01K 1/0154 |
| | | | | 119/172 |
| 5,359,961 A | * | 11/1994 | Goss | A01K 1/0155 |
| | | | | 119/173 |
| 5,386,803 A | * | 2/1995 | Hughes | A01K 1/0154 |
| | | | | 119/173 |
| 5,647,300 A | * | 7/1997 | Tucker | A01K 1/0154 |
| | | | | 119/172 |
| 5,975,019 A | * | 11/1999 | Goss | A01K 1/0154 |
| | | | | 119/173 |
| 6,376,034 B1 | | 4/2002 | Brander | |
| 8,074,604 B2 | | 12/2011 | Swank | |
| 9,345,227 B2 | | 5/2016 | Kuras et al. | |
| 9,408,368 B2 | | 8/2016 | Kuras et al. | |
| 9,433,918 B2 | | 9/2016 | Riley | |
| 9,439,393 B1 | | 9/2016 | Kuras et al. | |
| 9,894,877 B2 | * | 2/2018 | Kuras | A01K 1/0154 |
| 10,188,076 B2 | | 1/2019 | Kuras et al. | |
| 10,440,934 B2 | | 10/2019 | Jiang et al. | |
| 10,470,433 B2 | | 11/2019 | Kuras et al. | |
| 10,477,833 B2 | | 11/2019 | Huck et al. | |
| 11,026,397 B2 | | 6/2021 | Kuras et al. | |
| 11,134,653 B2 | * | 10/2021 | Levine | A01K 1/0154 |

(Continued)

FOREIGN PATENT DOCUMENTS

| | | |
|---|---|---|
| CN | 102150627 A | 8/2011 |
| CN | 110036923 A | 7/2019 |
| WO | 2015100050 A1 | 7/2015 |
| WO | 2016032821 A1 | 3/2016 |

* cited by examiner

OTHER PUBLICATIONS

International Search Report, dated Jan. 22, 2024, 4 pages.
Written Opinion of the International Searching Authority, dated Jan. 22, 2024, 6 pages.

*Primary Examiner* — Monica L Perry

(74) *Attorney, Agent, or Firm* — The Webb Law Firm

(57) ABSTRACT

An absorbent composition includes composite granules formed from at least diatomaceous earth and sodium bentonite. The diatomaceous earth can include greater than 50 weight % of the composition, based on the total weight of the composition, and a weight ratio of the diatomaceous earth to the sodium bentonite can be within a range of from 51:49 to 95:5. The individual particles of diatomaceous earth composed of the composite granules have a $d_{90}$ particle size of 500 μm or smaller and the individual particles of sodium bentonite composed of the composite granules have a $d_{90}$ particle size of 250 μm or smaller.

21 Claims, 1 Drawing Sheet

(56)                         References Cited

U.S. PATENT DOCUMENTS

| | | | |
|---|---|---|---|
| 2004/0112298 A1* | 6/2004 | Buttersnack | A01K 1/0154 |
| | | | 119/171 |
| 2005/0175577 A1* | 8/2005 | Jenkins | B01J 20/12 |
| | | | 424/76.1 |
| 2006/0243212 A1 | 11/2006 | Jenkins et al. | |
| 2008/0236037 A1* | 10/2008 | Rose | C09D 197/00 |
| | | | 47/57.6 |
| 2011/0269759 A1 | 11/2011 | Coats et al. | |
| 2015/0289473 A1 | 10/2015 | Aylen et al. | |
| 2017/0265428 A1 | 9/2017 | Jiang et al. | |
| 2019/0270067 A1 | 9/2019 | Wang | |
| 2019/0297835 A1 | 10/2019 | Cortner et al. | |
| 2020/0222837 A1 | 7/2020 | Bhimaraja et al. | |
| 2024/0424472 A1* | 12/2024 | Harpur | B01J 20/3042 |

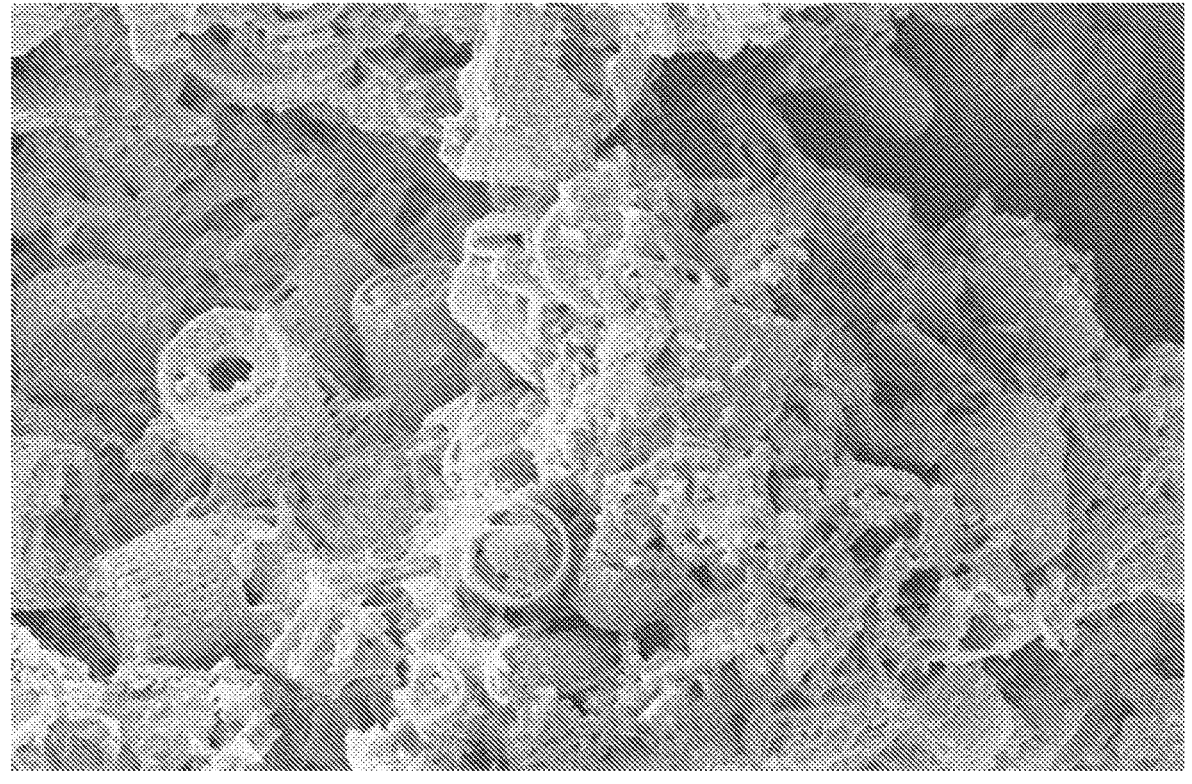

ABSORBENT COMPOSITIONS, METHODS OF FORMING THE SAME, AND ANIMAL LITTER PREPARED WITH SUCH COMPOSITIONS

CROSS-REFERENCE TO RELATED APPLICATIONS

This application je the United States national phase of International Application No. PCT/US23/28660, filed on Jul. 26, 2023, and claims priority to U.S. Provisional Application No. 63/392,331, filed on Jul. 26, 2022, the disclosures of which are hereby incorporated by reference in their entireties.

BACKGROUND OF THE INVENTION

Field of the Invention

The present invention relates to absorbent compositions for absorbing liquids, methods of forming the absorbent compositions, and animal litter (e.g. cat litter) prepared from the absorbent compositions.

Description of Related Art

Absorbent compositions are used in a variety of applications. Such absorbent compositions are placed on a liquid spilled over a surface to absorb the liquid material or the composition can be position in area where a liquid material will likely be deposited. For example, absorbent compositions are also typically used in animal litter, such as a cat litter, where an animal (e.g. a domestic pet) is trained to urinate.

While extensive efforts have been invested in developing absorbent compositions, there is still a need for improved absorbent compositions, such as absorbent compositions that can be used in animal litter. For instance, it is describable to provide absorbent compositions that have a high liquid absorbency, low dustiness, low density, high clumping ability for easy disposal, and the like. As such, it is desirable to provide new absorbent compositions with improved, desirable properties.

SUMMARY OF THE INVENTION

The present disclosure relates to an absorbent composition that includes composite granules formed from at least diatomaceous earth and sodium bentonite. In certain non-limiting embodiments, the diatomaceous earth comprises greater than 50 weight % of the composition, based on the total weight of the composition, and a weight ratio of the diatomaceous earth to the sodium bentonite is within a range of from 51:49 to 95:5. In some non-limiting embodiments, the individual particles of diatomaceous earth can also have a $d_{90}$ particle size of 500 μm or smaller and the individual particles of sodium bentonite can have a $d_{90}$ particle size of 250 μm or smaller.

In some non-limiting embodiments, the individual particles of diatomaceous earth can also have a d90 particle size of 250 μm or smaller. In some non-limiting embodiments, the individual particles of sodium bentonite can have a d90 particle size of 150 μm or smaller, or 75 μm or smaller.

In some non-limiting embodiments, the diatomaceous earth comprises greater than 60 weight % of the composition, based on the total weight of the composition. The weight ratio of the diatomaceous earth to the sodium bentonite can also be within a range of from 60:40 to 90:10, or within a range of from 75:25 to 85:15. In some non-limiting embodiments, the sodium bentonite has a $d_{90}$ particle size of 150 μm or smaller.

In certain non-limiting embodiments, 90 weight % of the composite granules have a particle size distribution within a range of from 250 μm to 4000 μm. The absorbent composition is completely free of a binder (other than sodium bentonite). In another non-limiting embodiment, the absorbent composition further includes a binder.

In certain non-limiting embodiments, all solid components that form the absorbent composition consist of the diatomaceous earth and the sodium bentonite. In another non-limiting embodiment, the composite granules are at least partially coated with a polymeric agent. The polymeric agent can comprise polytetrafluoroethylene as a non-limiting example. In certain non-limiting embodiments, the polymeric agent comprises an amount of 0.5 weight % or less of a total weight of the composite granules. The coated composite granules can also have a dustiness, as measured by the dustiness method described herein, within a range of 10 to 50 mg/m$^3$.

The present disclosure is also directed to an animal litter comprising the absorbent composition. The absorbent composition can include any of the compositions previously described. In certain non-limiting embodiments, the animal litter is a cat litter.

The present disclosure further includes a method of forming the absorbent composition. In certain non-limiting embodiments, the method includes: mixing diatomaceous earth and sodium bentonite to form a mixture; spraying and mixing the mixture with water to form wet granules; drying the wet granules; and crushing and sieving the dried granules to obtain composite granules comprising the diatomaceous earth and the sodium bentonite having desired granular sizes. The diatomaceous earth can comprise greater than 50 weight % of the composition, based on the total weight of the composition, and a weight ratio of the diatomaceous earth to the sodium bentonite can be within a range of from 51:49 to 95:5. The individual particles of diatomaceous earth composed of the composite granules can also have a $d_{90}$ particle size of 500 μm or smaller and the individual particles of sodium bentonite composed of the composite granules can have a $d_{90}$ particle size of 250 μm or smaller.

In certain non-limiting embodiments, the water is added to the mixture in an amount within a range of from 10 weight % to 100 weight % of the total weight of the mixture determined prior to adding the water. A binder can also be added to the water prior to spraying the mixture, or the method can be free of adding such a binder. If added, in certain non-limiting embodiments, the binder can comprise sodium carboxymethyl cellulose, starch, dextrin, guar gum, poly(vinyl alcohol), or a combination thereof. In some non-limiting embodiment, the method further includes coating the dried granules with a polymeric agent.

The present disclosure is also directed to the following clauses.

Clause 1: An absorbent composition comprising: composite granules comprising diatomaceous earth and sodium bentonite, wherein the diatomaceous earth comprises greater than 50 weight % of the composition, based on the total weight of the composition, and a weight ratio of the diatomaceous earth to the sodium bentonite is within a range of from 51:49 to 95:5, and wherein the individual particles of diatomaceous earth composed of the composite granules have a $d_{90}$ particle size of 500 μm or smaller and the individual particles of sodium bentonite composed of the composite granules have a do particle size of 250 μm or smaller.

Clause 2: The absorbent composition of clause 1, wherein the diatomaceous earth comprises greater than 60 weight % of the composition, based on the total weight of the composition.

Clause 3: The absorbent composition of any one of the preceding clauses, wherein the weight ratio of the diatomaceous earth to the sodium bentonite is within a range of from 60:40 to 90:10.

Clause 4: The absorbent composition of any one of the preceding clauses, wherein the weight ratio of the diatomaceous earth to the sodium bentonite is within a range of from 75:25 to 85:15.

Clause 5: The absorbent composition of any one of the preceding clauses, wherein the sodium bentonite has a $d_{90}$ particle size of 150 μm or smaller.

Clause 6: The absorbent composition of any one of the preceding clauses, wherein 90 weight % of the composite granules have a particle size distribution within a range of from 250 μm to 4000 μm.

Clause 7: The absorbent composition of any one of the preceding clauses, wherein the absorbent composition is completely free of a binder, other than sodium bentonite.

Clause 8: The absorbent composition of any one of clauses 1-6, further comprising a binder.

Clause 9: The absorbent composition of any one of the preceding clauses, wherein all solid components that form the absorbent composition consist of the diatomaceous earth and the sodium bentonite.

Clause 10: The absorbent composition of any one of the preceding clauses, wherein the composite granules are at least partially coated with a polymeric agent.

Clause 11: The absorbent composition of clause 10, wherein the polymeric agent comprises polytetrafluoroethylene.

Clause 12: The absorbent composition of any one of clauses 10 and 11, wherein the polymeric agent comprises an amount of 0.5 weight % or less of a total weight of the composite granules.

Clause 13: The absorbent composition of any one of the preceding clauses, wherein the coated composite granules have a dustiness, as measured by the dustiness method, within a range of 10 to 50 mg/m³.

Clause 14: An animal litter comprising the absorbent composition of any one of the preceding clauses.

Clause 15: The animal litter of clause 14, wherein the animal litter is a cat litter.

Clause 16: A method of forming an absorbent composition, the method comprising: mixing diatomaceous earth and sodium bentonite to form a mixture; spraying and mixing the mixture with water to form wet granules; drying the wet granules; and crushing and sieving the dried granules to obtain composite granules comprising the diatomaceous earth and the sodium bentonite having desired granular sizes, wherein the diatomaceous earth comprises greater than 50 weight % of the composition, based on the total weight of the composition, and a weight ratio of the diatomaceous earth to the sodium bentonite is within a range of from 51:49 to 95:5, and wherein individual particles of diatomaceous earth composed of the composite granules have a $d_{90}$ particle size of 500 μm or smaller and the individual particles of sodium bentonite composed of the composite granules have a $d_{90}$ particle size of 250 μm or smaller.

Clause 17: The method of clause 16, wherein the water is added to the mixture in an amount within a range of from 10 weight % to 100 weight % of the total weight of the mixture determined prior to adding the water.

Clause 18: The method of any one of clauses 16 and 17, wherein a binder is added to the water prior to spraying the mixture.

Clause 19: The method of clause 18, wherein the binder comprises sodium carboxymethyl cellulose, starch, dextrin, guar gum, poly(vinyl alcohol), or a combination thereof.

Clause 20: The method of any one of clauses 16-19, further comprising coating the dried granules with a polymeric agent.

BRIEF DESCRIPTION OF THE DRAWINGS

FIG. 1 is an SEM photograph of a composite particle containing both diatomaceous earth and sodium bentonite according to the present disclosure.

DESCRIPTION OF THE INVENTION

For purposes of the following detailed description, it is understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in its respective testing measurement.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

Further, the terms "upper", "lower", "right", "left", "vertical", "horizontal", "top", "bottom", "lateral", "longitudinal", and derivatives thereof shall relate to the disclosure as it is oriented in the drawing FIGURES. However, it is to be understood that the disclosure may assume alternative variations and step sequences, except where expressly specified to the contrary. It is also to be understood that the specific devices and processes illustrated in the attached drawings, and described in the specification, are simply exemplary embodiments of the disclosure. Hence, specific dimensions and other physical characteristics related to the embodiments disclosed herein are not to be considered as limiting.

As indicated, in certain non-limiting embodiments, the present disclosure is directed to an absorbent composition. As used herein, an "absorbent composition" refers to a composition that has the ability to absorb at least liquids upon contact. It is appreciated that the absorbent composition can absorb liquids associated with solid and semi-solid based materials.

In some non-limiting embodiments, the absorbent composition comprises composite granules comprising diatomaceous earth and sodium bentonite. As used herein, "composite granules" refers to a mixture of two or more different granulated materials. It is appreciated that the different materials can provide different properties to the composite. For instance, the diatomaceous earth and sodium bentonite that form at least a portion or all of the composite granules help provide different desirable properties to the absorbent composition. FIG. 1 is an SEM photograph of a composite particle containing both diatomaceous earth and sodium bentonite according to the present disclosure.

The diatomaceous earth and sodium bentonite that form at least a portion or all of the composite granules have certain particle sizes. In certain non-limiting embodiments, the individual particles of diatomaceous earth composed of the composite granules can have a $d_{90}$ particle size of 500 μm or smaller, and the individual particles of sodium bentonite composed of the composite granules can have a $d_{90}$ particle size of 250 μm or smaller. As used herein, a "$d_{90}$ particle size" refers to the average diameter of a sample of particles where 90 weight percent of the particles have sizes smaller than the $d_{90}$ value given. The $d_{90}$ particle sizes are determined by sieving with a stack of US Standard test sieves.

In certain non-limiting embodiments, the individual particles of diatomaceous earth have a $d_{90}$ particle size of 250 μm or smaller, or 200 μm or smaller, or 100 μm or smaller. In certain non-limiting embodiments, the individual particles of sodium bentonite have a $d_{90}$ particle size of 200 μm or smaller, or 150 μm or smaller, or 100 μm or smaller, or 75 μm or smaller.

The composite granules can also have a particle size distribution. For instance, in certain non-limiting embodiments, 90 weight % of the composite granules have a particle size distribution within a range of from 250 μm to 4000 μm, or within a range of from 250 μm to 2000 μm, or within a range of from 500 μm to 1400 μm.

The diatomaceous earth and sodium bentonite are also added to the absorbent composition at particular amounts to provide the desired properties. For example, the diatomaceous earth can comprise greater than 50 weight %, or 60 weight % or greater, or 70 weight % or greater, or 80 weight % or greater of the absorbent composition, based on the total weight of the absorbent composition. Further, in certain non-limiting embodiments, the sodium bentonite can comprise less than 50 weight %, or 40 weight % or less, or 30 weight % or less, or 20 weight % or less of the absorbent composition, based on the total weight of the absorbent composition.

The diatomaceous earth and sodium bentonite can also be mixed at a particular ratio to each other. For instance, in some non-limiting embodiments, a weight ratio of the diatomaceous earth to the sodium bentonite is within a range of from 51:49 to 95:5, or within a range of from 60:40 to 90:10, or within a range of from 70:30 to 90:10, or within a range of from 75:25 to 90:10, or within a range of from 75:25 to 85:15.

In some non-limiting embodiments, a binder other than the sodium bentonite is used in the granulation step. As used herein, a "binder" refers to a constituent material that typically holds all compositional components together. The binder can include one or more resins. Non-limiting examples of resins that can form at least a portion of the binder include sodium carboxymethyl cellulose, starch, dextrin, guar gum, poly(vinyl alcohol), or a combination thereof.

Further, the previously described resins can have a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), unsaturated ethylene groups, and combinations thereof. As used herein, "unsaturated ethylene" refers to a group having at least one carbon-carbon double bond and include, but are not limited to, (meth)acrylate groups, vinyl groups, and combinations thereof.

The binder may also include a crosslinker that may be selected to react with the functionality of the one or more resins. As used herein, the term "crosslinker" refers to a molecule comprising two or more functional groups that are reactive with other functional groups and that is capable of linking two or more monomers or polymers through chemical bonds. It is appreciated that the resins that form the binder of the composition can also have functional groups that are reactive with themselves; in this manner, such resins are self-crosslinking.

In certain non-limiting embodiments, the composite granules are at least partially coated with a polymeric agent. As used herein, a "polymeric agent" refers to an application agent formed from one or more polymers. As used herein, the term "polymer" is used interchangeably with "resin," and the term polymer refers to homopolymers (e.g., prepared from a single monomer species), copolymers (e.g., prepared from at least two monomer species), and graft polymers.

A non-limiting example of a polymeric agent that can be used to at least partially coat the composite granules includes polytetrafluoroethylene. Other non-limiting examples of polymeric agents that can be used to at least partially coat the composite granules include polyvinyl alcohol. It is appreciated that the composite granules can be coated with one or any combination of polymeric agents, such as one or any combination of the previously described polymeric agents.

As previously described, the composite granules can optionally be at least partially coated with a polymer agent. In certain non-limiting embodiments, the polymeric agent comprises an amount of 0.5 weight % or less, or 0.3 weight % or less, or 0.1 weight % or less, of a total weight of the composite granules. It is also appreciated that in certain embodiments the composite granules can be completely free of the previously described polymeric agents for coating the composite granules.

In certain non-limiting embodiments, the composite granules are only formed from the diatomaceous earth and the sodium bentonite. In other non-limiting embodiments, the composite granules can include additional materials. For example, the composite granules can also include expanded perlite, vermiculate, calcium bentonite, kaolin, ball clay, cellulose, dried plant matter, and any combination thereof.

The solid components that form the absorbent composition can in certain non-limiting embodiments only include the previously described composite granules. For instance, in certain non-limiting embodiments, the solid components that form the absorbent composition may only include the diatomaceous earth and the sodium bentonite that make-up the composite granules.

In other non-limiting embodiments, the absorbent composition can include additional components. For example, the absorbent composition can further include a binder, pigments, deodorants, fragrant, and/or other components and additives. As used herein, a "binder" refers to a constituent material that typically holds all compositional components together. The binder can include one or more resins.

Non-limiting examples of resins that can form at least a portion of the binder include sodium carboxymethyl cellulose, starch, dextrin, guar gum, poly(vinyl alcohol), or a combination thereof.

Further, the previously described resins can have a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), unsaturated ethylene groups, and combinations thereof. As used herein, "unsaturated ethylene" refers to a group having at least one carbon-carbon double bond and include, but are not limited to, (meth)acrylate groups, vinyl groups, and combinations thereof.

The binder may also include a crosslinker that may be selected to react with the functionality of the one or more resins. As used herein, the term "crosslinker" refers to a molecule comprising two or more functional groups that are reactive with other functional groups and that is capable of linking two or more monomers or polymers through chemical bonds. It is appreciated that the resins that form the binder of the composition can also have functional groups that are reactive with themselves; in this manner, such resins are self-crosslinking.

As previously described, the composition can also include pigments. Non-limiting examples of pigments include titanium dioxide, aluminum trihydrate, carbon black, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), and mixtures thereof.

Other non-limiting examples of components that can be used with the absorbent compositions include fillers, fragrance agents, UV light absorbers and stabilizers, dyes, tints, and other customary components used to form a desired end product. The composition can also be free of any one of the previously described additional components. For instance, the absorbent composition can be completely free of a binder, other than sodium bentonite.

The present invention also relates to methods of forming the previously described absorbent compositions. In certain non-limiting embodiments, the method includes mixing diatomaceous earth and sodium bentonite to form a mixture; spraying and mixing the mixture with water to form wet granules; drying the wet granules; and crushing and sieving the dried granules to obtain composite granules comprising the diatomaceous earth and the sodium bentonite having any of the previously described particles sizes and/or particle size distributions. It is appreciated that the method can include mixing the diatomaceous earth and sodium bentonite to provide any of the previously described amounts of each component, weight ratios of the diatomaceous earth to the sodium bentonite, and/or the like.

In certain non-limiting embodiments, the water added during spraying is added to the mixture in an amount within a range of from 10 weight % to 100 weight %, or within a range of from 10 weight % to 90 weight %, or within a range of from 20 weight % to 80 weight %, or within a range of from 30 weight % to 70 weight %, of the total weight of the mixture determined prior to adding the water. In some non-limiting embodiments, the liquid to solid weight ratio is within a range of from 1:4 to 1:2 to agglomerate.

Various types of instruments known in the art may be used to perform the steps of the method. For instance, the mixing steps can be conducted using various types of known mixers including a high intensive, a high shearing, or a high speed mixer. A non-limiting example is a high intensity Eirich mixer, which has been found to provide a higher efficiency of granulating into the desired size fractions the first time and can eliminate the need of crushing and fine recirculation. The drying can also be conducted using various types of solar or thermal dryers, and the sizing of the dried granules may be carried out by sieving the product to desired mesh size fractions using a sieving device such as a vibratory screener, a rotary screener, or a centrifugal screener.

In certain non-limiting embodiments, the sizing can be carried out using a closed circuit crushing and sieving in which the oversize fraction from sieving is crushed and then returned to the sieving step. The crushing device may be a roll crusher, a hammer mill, a cage mill, an impact mill, a pin mill, and the like. In some non-limiting embodiments, the undersize fractions from the sieving operation may be recirculated back to the granulation step to be re-granulated.

The method can also include additional, optional steps. For example, the method can further include a step of introducing a binder. The binder can include any one of the previously described binders. In certain non-limiting embodiments, the binder is introduced by adding the binder to the water prior to spraying the mixture.

In certain non-limiting embodiments, the method further includes coating the dried granules with a polymeric agent. The polymeric agent can include any of the previously described polymeric agents. The coating process can be carried out by spraying a suspension, emulsion, or solution of the polymeric agent onto a surface of a fluidized bed of the composite granules. The coating agent can also be applied by atomizing a polymer suspension with polymeric nanoparticles being fibrillated through a compressed air atomizing nozzle.

The present invention further relates to an animal litter formed with the previously described absorbent compositions. As used herein, the term "animal litter" refers to a material comprising an absorbent composition or component that is capable of absorbing liquids found in animal excretions, such as animal urine. A non-limiting example of an animal litter that can be formed with the previously described absorbent compositions is a cat litter capable of absorbing liquids found in cat excretions, such as cat urine.

The animal litter can be formed with only one or more of the absorbent compositions. In another non-limiting embodiment, the animal litter include one or more additional components in addition to the previously described absorbent compositions, such as components typically associated with animal litter products and/or kits. It is appreciated that the absorbent compositions can be used in a variety of other applications to absorb liquids. For instance, the absorbent compositions can be used to absorb spilled liquids, such as spilled water, oil, and the like.

It was found that the absorbent compositions previously described can provide a high absorbency of liquids (e.g. animal urine), low dustiness, and a high clumping ability for easy disposal. For example, it was found that the composite granules of the absorbent composition can exhibit a dustiness within a range of 10 to 50 mg/m³.

The dustiness was determined using an apparatus consisting of (1) a TSI DustTrak DRX Aerosol Monitor 8534, (2) a dust box of 13.5" depth by 22.25" width by 36" height with a sample flap-door at the top with a small sample tray affixed on and a wide door in the lower end of the front side, and (3) a large square sample tray positioned inside the box through the lower door on the front side. The DustTrak DRX 8534 instrument simultaneously measures both mass and size-fraction of the dust cloud generated by a sample. It measures size-segregated mass fraction concentrations corresponding to PM1, PM2.5, Respirable, PM10, and Total PM using an external pump and real-time, 90°, light-scattering laser photometers. The procedure for testing is as follows: (1) place the large sample tray in the bottom of the "dust box". (2) place a calibrated Aerosol Monitor with power on inside the large tray in one corner. (3) press "Start" on the instrument and close the front door, (4) place a 50-g sample of a granular product in the small sample tray at the top, (5) flip the top door to allow the granules to free fall to the bottom and the instrument measures the concentration of dust particles in the dust cloud which varies with time, and (6) open the front door to collect the data from the analyzer. The maximum concentration of particulates in the dust cloud was recorded and used as the measure of dustiness. This method is referred to herein as the "dustiness method".

As previously described, the absorbent granular compositions previously described can exhibit a high clumping ability. A clump is produced when the granules get wet (e.g., when a cat urinates) and then clump or stick together, allowing the clump to be removed from the rest of the litter. The clumps formed can have a value of 1, where the clump remains intact in a single ball or clump when dropped from a certain height, either 12 inches or 48 inches. Other values would be a 2, where the clump breaks into 2 pieces, or a 3 where the clump breaks into three or more pieces. It was found that the absorbent compositions can exhibit a value of 1.

In addition to the above benefits, the absorbent compositions previously described are also light weight. For instance, the bulk density of the absorbent compositions previously described can have a bulk density selected within a range between 30 and 40 lbs/ft³, which provides a light weight absorbent composition for cat litter as compared to heavy weight or traditional cat litters.

The following examples are presented to demonstrate the general principles of the invention. The invention should not be considered as limited to the specific examples presented. All parts and percentages in the examples are by weight unless otherwise indicated.

Example 1

Preparation and Analysis of Composite Granules of Diatomaceous Earth and Sodium Bentonite A fine powder of natural diatomaceous earth (DE) and a fine powder of sodium bentonite were used in the bench scale development of making the composite granules. Properties of the raw materials are listed in Table 1. The moisture content was measured by drying in an oven at 225° F. overnight and loss on ignition (LOI) by heating in a muffle furnace at 1800° F. for 60 min. The chemical composition was analyzed by the XRF method and the particle size distribution was determined by sieving for 15 minutes in a stack of US standard test sieves on a W.S. Tyler™ Ro-Tap® Sieve Shaker RX-29 by W.S. Tyler of Mentor, OH.

TABLE 1

| Feed | Loss on Heating (%) | | Particle Size Distribution, US Mesh (%) | | | | | | |
|---|---|---|---|---|---|---|---|---|---|
| Material | Moisture | LOI | +10 | +18 | +35 | +60 | +100 | +200 | −200 |
| DE-A | 3.7 | 5.9 | 0.1 | 0.8 | 3.1 | 10.1 | 21.2 | 37.5 | 62.5 |
| DE-B | 3.6 | 6.1 | 1.9 | 3.6 | 9.0 | 28.0 | 36.6 | 48.9 | 51.1 |
| NaBen-A | 11.4 | 5.1 | 0.0 | 0.0 | 0.0 | 1.3 | 5.2 | 20.0 | 80.0 |
| NaBen-B | 12.4 | 6.6 | 0.0 | 0.0 | 0.8 | 4.9 | 11.7 | 29.1 | 70.9 |

| Feed | Major Chemical Composition on Ignited Basis (%) | | | | | | | |
|---|---|---|---|---|---|---|---|---|
| Material | SiO2 | Al2O3 | CaO | MgO | Na2O | K2O | Fe2O3 | S |
| DE-A | 86.1 | 8.0 | 1.0 | 0.4 | 0.4 | 0.4 | 3.1 | 0.05 |
| DE-B | 86.8 | 7.9 | 0.9 | 0.4 | 0.4 | 0.3 | 2.8 | 0.05 |
| NaBen-A | 69.3 | 19.0 | 1.3 | 2.3 | 2.5 | 0.5 | 4.5 | 0.2 |
| NaBen-B | 67.1 | 20.6 | 1.5 | 2.4 | 2.1 | 0.5 | 5.3 | 0.2 |

Next, granulation was carried out with 100 g of combined weight of DE-A and NaBen-A, in a desired weight ratio, in a plastic jar of 1 liter volume. The feed components were mixed in the capped jar by shaking for 15 minutes in a Pacer 15 paint shaker by Miracle Paint Rejuvenator Co., Inc. of Inver Grove Heights, MN. A desired amount of water was then sprayed to the dry mix from a hand spray bottle while at the same time turning the jar to expose the dry powder. The wet mix was then granulated by shaking in the same paint shaker for another 15 minutes. The wet granules were then transferred to a drying pan to dry in an oven set at 225° F. for 75-90 minutes. The dried granules were analyzed for particle size distribution. As shown in Table 2, the granulation was effective within the test ranges, and the level of granulation varied with the ratio of sodium bentonite to DE and the amount water addition.

TABLE 2

| | | \multicolumn{7}{c}{NaBen/DE Ratio} | | | | | | |
| | | 50/50 | 40/60 | 30/70 | 30/70 | 20/80 | 20/80 | 20/80 |
| | | \multicolumn{7}{c}{Water (% of dry feed)} | | | | | | |
| | | 50 | 50 | 50 | 45 | 45 | 50 | 54 |
| Dried Granule | +10 | 9.6 | 7.5 | 83.9 | 94.8 | 66.5 | 82.7 | 89.9 |
| Particle Size | +18 | 59.6 | 52.9 | 91.4 | 97.8 | | | |
| Distribution, | +35 | 78.7 | 80.8 | 94.3 | 98.5 | 81.0 | 92.7 | 93.7 |
| US Mesh (%) | +60 | 92.6 | 92.6 | 96.5 | 99.6 | 88.2 | 95.9 | 95.7 |

Example 2

Preparation of Composite Granules of Diatomaceous Earth and Sodium Bentonite with a Sodium Carboxymethyl Cellulose Binder A granulation test was conducted with the same feed materials and the same procedure as Example 1, except that, instead of water, a 0.5% aqueous solution of sodium carboxymethyl cellulose (NaCMC) was used as the binder for granulation. The ratio of sodium bentonite to DE was 10/90 and the addition of NaCMC solution was 60% of the total weight of the dry feed. The dried granules were 45.7%+18, 76.1%+35 and 93.8%+60 mesh.

Example 3

Preparation of Granulated Composite Granules

The +10 mesh fractions from several dried granular products from Example 1 in which the ratio of sodium bentonite to DE was 20/80 were crushed with a steel rolling pin to −10 mesh. The resulting product had a particles size distribution of 33.2%−10+18 mesh and 48.4%−10+35 mesh.

Example 4

Re-Granulation Analysis

Following the granulation procedure of Example 1, the −35 mesh fractions from Examples 1 & 3 in which the ratio of sodium bentonite to DE was 20/80 were combined and sprayed with water at 50% of the weight of the dry powder. The dried granules had a particle size distribution of 89.1%+10, 90.6%+18 and 94.9%+35 mesh. This indicates that the fines from sieving and crushing the granules can be re-granulated by the same method.

Example 5

Granulation with Eirich Intensive Mixer

Sodium bentonite (NaBen-B) and natural diatomaceous earth (DE-B) in Table 1 were added to a batch intensive mixer EL 10 from Eirich Machines of Gurnee, IL as the granulator, using a micro-granulation tool. The pan and the mixing tool were run at opposite directions. The granulation steps included: (1) premix diatomaceous earth and sodium bentonite; (2) water addition with the mixer running; and (3) post mixing. The wet granules were dried in an oven and analyzed for particle size distribution by sieving.

The test parameters and results are listed in Table 3. It is noted that the mixing process parameters may be optimized to adjust the top size of the granules to narrow or broaden the granular size distribution

TABLE 3

| \multicolumn{3}{c}{Batch Loading, kg} | | | \multicolumn{3}{c}{Tool Tip Speed, m/s (Time, min)} | | | \multicolumn{4}{c}{Dried Granule Size Distribution (US Mesh, %)} | | | |
| NaBen-B | DE-B | Water | Pre-mixing | Water addition | Post-mixing | +10 | +18 | +35 | +60 |
| 0.55 | 2.18 | 1.48 | 15 (1) | 15 (6.5) | 15 (1) + 10 (0.5) | 17.8 | 67.9 | 95.6 | 99.0 |

Example 6

Pilot Scale Testing

Sodium bentonite NaBen-B and natural diatomaceous earth DE-B in Table 1 were used in a pilot scale testing. A highspeed paddle mixer 1672 HSB from Scott Equipment Co from New Prague, MN was used as the granulator. The mixer had an internal diameter of 16 inches and a length of 72 inches, and for the granulation tests the mixer was run at 1000 rpm. Both raw materials were fed to the mixer continuously in a desired ratio through calibrated respective volumetric feeders and at a combined rate of 1200 lbs per hour. Water was injected to the mixer at a desired rate as measured by a float-type flowmeter and through a spray nozzle at a port that was a few flights of mixing paddles downstream that allowed mixing of the dry powders. The test conditions and results are listed in Table 3. As shown in Table 3, the moisture in the mixer discharge was significantly lower than that calculated from moistures in the dry feed and the water added. This was the result of evaporation from the elevated temperature in the mixer and the mixer discharges.

Example 7

Dustiness Analysis

The dried and sized granular products were tested for dustiness with an apparatus consisting of (1) a TSI DustTrak DRX Aerosol Monitor 8534, (2) a "dust box of 13.5" depth by 22.25" width by 36" height with a sample flap-door at the top with a small sample tray affixed on and a wide door in the lower end of the front side, and (3) a large square sample tray fit inside the box through the lower door on the front side. The DustTrak DRX 8534 instrument simultaneously measures both mass and size-fraction of the dust cloud generated by a sample. It measures size-segregated mass fraction concentrations corresponding to PM1, PM2.5,

TABLE 3

| Feed rate (lbs/hr) | | NaBen/DE | Water Injection | Calculated Total Moisture | Wet Sample Moisture | Dried Granule Size Distribution, US Mesh (%) | | | |
|---|---|---|---|---|---|---|---|---|---|
| NaBen-B | DE-B | Ratio | (GPM) | (%) | (%) | +10 | +18 | +35 | +60 |
| 240 | 960 | 20/80 | 1.6 | 44 | 31 | 50.4 | 86.7 | 96.1 | 99.2 |
| 180 | 1020 | 15/85 | 1.5 | 42 | 36 | 28.5 | 72.1 | 92.0 | 98.3 |
| 300 | 900 | 25/75 | 1.0 | 34 | 30 | 17.5 | 43.7 | 74.3 | 94.4 |

Next, the bulk samples from the continuous granulation tests were dried in an oven, sieved at 10 and 35 meshes, and the oversize fractions (+10 mesh) were crushed in a hammer mill and sieved in a closed-loop fashion until the oversize fraction diminished to <1% of the total. The yields of the granules in the −10+35 mesh fractions were about 70-80%.

The granular products were then analyzed for bulk densities and water absorption. During the analysis, a weighed sample was poured through a funnel into a 250-ml graduated cylinder, the volume occupied in the cylinder and the sample weight were used to calculate the free fall density. The same cylinder containing the sample was then placed in an Autotap tapped density analyzer by Quantachrome Corp of Boynton Beach, FL, and after 1250 taps, tap density of the sample was calculated from its weight and the tapped volume in the cylinder. Water absorption of a sample was analyzed by an immersion method: a 20.0-g sample was filled in a cone-shaped basket made of a fine mesh screen, the sample basket was immersed in water for 20 minutes then raised to drain off access water for an additional 20 minutes, the weight of water uptake was obtained by weighing the wet sample basket minus the combined dry weight of the sample and the basket. Water absorption was expressed in the water uptake as a percentage of the dry sample weight. Water absorption is also expressed in the mass of water absorbed per unit volume of a granular product by dividing the % wt absorption with free fall density of the product, e.g., $lbs/ft^3$. The results of the previously described analysis are shown in Table 4.

Respirable, PM10, and Total PM using an external pump and real-time, 90°, light-scattering laser photometers. The procedure was as follows: (1) place the large sample tray in the bottom of the "dust box", (2) place a calibrated Aerosol Monitor with power on inside the large tray in one corner, (3) press "Start" on the instrument and close the front door, (4) place a 50-g sample of a granular product in the small sample tray at the top, (5) flip the top door to allow the granules to free fall to the bottom and the instrument measures the concentration of dust particles in the dust cloud which varies with time, and (6) open the front door to collect the data from the analyzer. In this invention, the maximum concentration of particulates in the dust cloud was recorded and used as the measure of dustiness. The sized granular products of Example 5 were measured to have high dustiness (>150 mg/m3, the limit of the instrument).

Moreover, certain polymeric agents may be used to suppress dustiness of particulate matter, such as suspensions or emulsions of colloid polytetrafluoroethylene (PTFE). To suppress the dustiness, Ultraflon AD-10 from Laura Products, a division of Whitford Corporation of Elverson, PA, was used to treat the sized granular products. The PTFE suspension was diluted with water to 6% by weight, placed in a pressure can. PTFE colloid particles in the suspension need to be fibrillated to create good coating on particle surfaces to create efficient dedusting. For this purpose, a Vortecx type 1713 compressed air atomizing nozzle from ITW Air Management of Cincinnati, OH, was connected to the pressure can and the automizing compressed air. The

TABLE 4

| NaBen/DE | Yield | Loss on Heating (%) | | Bulk density (%) | | Water Absorption | |
|---|---|---|---|---|---|---|---|
| Ratio | (%) | Moisture | LOI | Free Fall | Tapped | (% wt) | (lbs/ft3) |
| 20/80 | 80 | 1.4 | 6.1 | 32 | 36 | 159 | 51 |
| 15/85 | 76 | 1.8 | 6.0 | 32 | 37 | 123 | 40 |
| 25/75 | 69 | 0.7 | 6.1 | 34 | 39 | 180 | 61 | spray rate of the nozzle was adjusted to about 300 g/min under the conditions of can pressure 10 psig and atomizing air pressure of 20 psig. A 5-kg sample of a granulated and sized product was placed in a Kobalt 4-ft3 cement mixer which was then with its mouth covered by a plastic sheeting. The mixer was turned on and the nozzle tip was pushed through the plastic cover and started spraying. The spraying lasted a preset time and the mixer continued running for another 5 minutes. After the coating and mixing was completed, the coated product was discharged and cleared from the mixer and weighed and its moisture level was measured. Both measured moisture and calculated moisture from weight increase were used to verify the actual level of PTFE coating, and they were in general in good agreement. The test conditions and results are listed in Table 5, showing very significant reduction in dustiness—with PTFE application from 0.1 to 0.5% by weight, the dustiness was reduced from >150 to <25 mg/m$^3$. It appears that a higher diatomite to sodium bentonite ratio tends to favor a lower dustiness. It can also be seen that a higher application of PTFE tends to reduce the dustiness more efficiently.

TABLE 5

| NaBen/DE Ratio | PTFE (%) based on | | Bulk density (lbs/ft3) | | Water Absorption (% wt) | Dustiness (mg/m3) |
|---|---|---|---|---|---|---|
| | weight | moisture | Free fall | Tapped | | |
| 20/80 | 0.20 | 0.18 | 35 | 37 | 171 | 23 |
| 20/80 | 0.26 | 0.29 | 34 | 37 | 128 | 14 |
| 20/80 | 0.50 | 0.46 | 34 | 38 | 125 | 12 |
| 15/85 | 0.10 | 0.12 | 36 | 37 | 145 | 13 |
| 15/85 | 0.25 | 0.24 | 33 | 37 | 100 | 14 |
| 15/85 | 0.50 | 0.46 | 34 | 38 | 91 | 13 |
| 25/75 | 0.22 | 0.20 | 36 | 39 | 183 | 23 |

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An absorbent composition comprising:
   composite granules comprising diatomaceous earth and sodium bentonite,
   wherein the diatomaceous earth comprises greater than 50 weight % of the composition, based on the total weight of the composition, and a weight ratio of the diatomaceous earth to the sodium bentonite is within a range of from 51:49 to 95:5, and
   wherein the individual particles of diatomaceous earth composed of the composite granules have a d$_{90}$ particle size of 500 µm or smaller and the individual particles of sodium bentonite composed of the composite granules have a d$_{90}$ particle size of 250 µm or smaller.

2. The absorbent composition of claim 1, wherein the diatomaceous earth comprises greater than 60 weight % of the composition, based on the total weight of the composition.

3. The absorbent composition of claim 1, wherein the weight ratio of the diatomaceous earth to the sodium bentonite is within a range of from 60:40 to 90:10.

4. The absorbent composition of claim 1, wherein the weight ratio of the diatomaceous earth to the sodium bentonite is within a range of from 75:25 to 85:15.

5. The absorbent composition of claim 1, wherein the sodium bentonite has a d$_{90}$ particle size of 150 µm or smaller.

6. The absorbent composition of claim 1, wherein 90 weight % of the composite granules have a particle size distribution within a range of from 250 µm to 4000 µm.

7. The absorbent composition of claim 1, wherein the absorbent composition is completely free of a binder, other than sodium bentonite.

8. The absorbent composition of claim 1, further comprising a binder.

9. The absorbent composition of claim 1, wherein all solid components that form the absorbent composition consist of the diatomaceous earth and the sodium bentonite.

10. The absorbent composition of claim 1, wherein the composite granules are at least partially coated with a polymeric agent.

11. The absorbent composition of claim 10, wherein the polymeric agent comprises polytetrafluoroethylene.

12. The absorbent composition of claim 10, wherein the polymeric agent comprises an amount of 0.5 weight % or less of a total weight of the composite granules.

13. The absorbent composition of claim 10, wherein the coated composite granules have a dustiness, as measured by the dustiness method, within a range of 10 to 50 mg/m$^3$.

14. An animal litter comprising the absorbent composition of claim 1.

15. The animal litter of claim 14, wherein the animal litter is a cat litter.

16. A method of forming an absorbent composition, the method comprising:
   mixing diatomaceous earth and sodium bentonite to form a mixture;
   spraying the mixture with water to form wet granules;
   drying the wet granules; and
   crushing and sieving the dried granules to obtain composite granules comprising the diatomaceous earth and the sodium bentonite having desired granular sizes,
   wherein the diatomaceous earth comprises greater than 50 weight % of the composition, based on the total weight of the composition, and a weight ratio of the diatomaceous earth to the sodium bentonite is within a range of from 51:49 to 95:5, and
   wherein the individual particles of diatomaceous earth composed of the composite granules have a d$_{90}$ particle size of 500 µm or smaller and the individual particles of sodium bentonite composed of the composite granules have a doo particle size of 250 µm or smaller.

17. The method of claim 16, wherein the water is added to the mixture in an amount within a range of from 10 weight % to 100 weight % of the total weight of the mixture determined prior to adding the water.

18. The method of claim 16, wherein a binder is added to the water prior to spraying the mixture.

19. The method of claim 18, wherein the binder comprises sodium carboxymethyl cellulose, starch, dextrin, guar gum, poly(vinyl alcohol), or a combination thereof.

20. The method of claim 16, further comprising coating the dried granules with a polymeric agent.

21. The method of claim 20, the polymeric agent is polytetrafluoroethylene.

\* \* \* \* \*